(12) United States Patent
Choi et al.

(10) Patent No.: US 12,104,756 B2
(45) Date of Patent: Oct. 1, 2024

(54) DETACHABLE LIGHT AND VEHICLE INCLUDING THE SAME

(71) Applicant: HYUNDAI MOBIS CO., LTD., Seoul (KR)

(72) Inventors: Hyoung Jin Choi, Yongin-si (KR); Ban Suk Choi, Yongin-si (KR); Cheon Seop Shin, Yongin-si (KR); Jun Hyuk Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/507,382

(22) Filed: Nov. 13, 2023

(65) Prior Publication Data

US 2024/0191847 A1    Jun. 13, 2024

(30) Foreign Application Priority Data

Dec. 13, 2022 (KR) .......................... 10-2022-0173503

(51) Int. Cl.
| | |
|---|---|
| *F21L 4/08* | (2006.01) |
| *B60Q 1/04* | (2006.01) |
| *B60R 11/00* | (2006.01) |
| *F21L 4/02* | (2006.01) |
| *F21W 107/10* | (2018.01) |

(52) U.S. Cl.
CPC .............. *F21L 4/08* (2013.01); *B60Q 1/0483* (2013.01); *F21L 4/02* (2013.01); *B60R 2011/0057* (2013.01); *F21W 2107/10* (2018.01)

(58) Field of Classification Search
CPC . F21L 4/02; F21L 4/08; B60Q 1/0483; B60Q 1/2615; F21V 21/0965
See application file for complete search history.

(56) References Cited

U.S. PATENT DOCUMENTS 9,423,114 B1 * 8/2016 Malina .................... F21L 4/085
2019/0093865 A1 * 3/2019 Walser ................... F21V 14/065

FOREIGN PATENT DOCUMENTS

KR         10-2085128 B      3/2020

\* cited by examiner

*Primary Examiner* — Thomas M Sember
(74) *Attorney, Agent, or Firm* — NSIP Law

(57) ABSTRACT

A detachable light including an outer inclined portion, an inner inclined portion disposed inside the outer inclined portion, a cradle disposed between the outer inclined portion and the inner inclined portion, a frame connected to the outer inclined portion, a battery surrounded by the outer inclined portion and the inner inclined portion, and at least one auxiliary light disposed adjacent to the frame, in which the detachable light is capable of being attached to or detached from a vehicle.

17 Claims, 8 Drawing Sheets

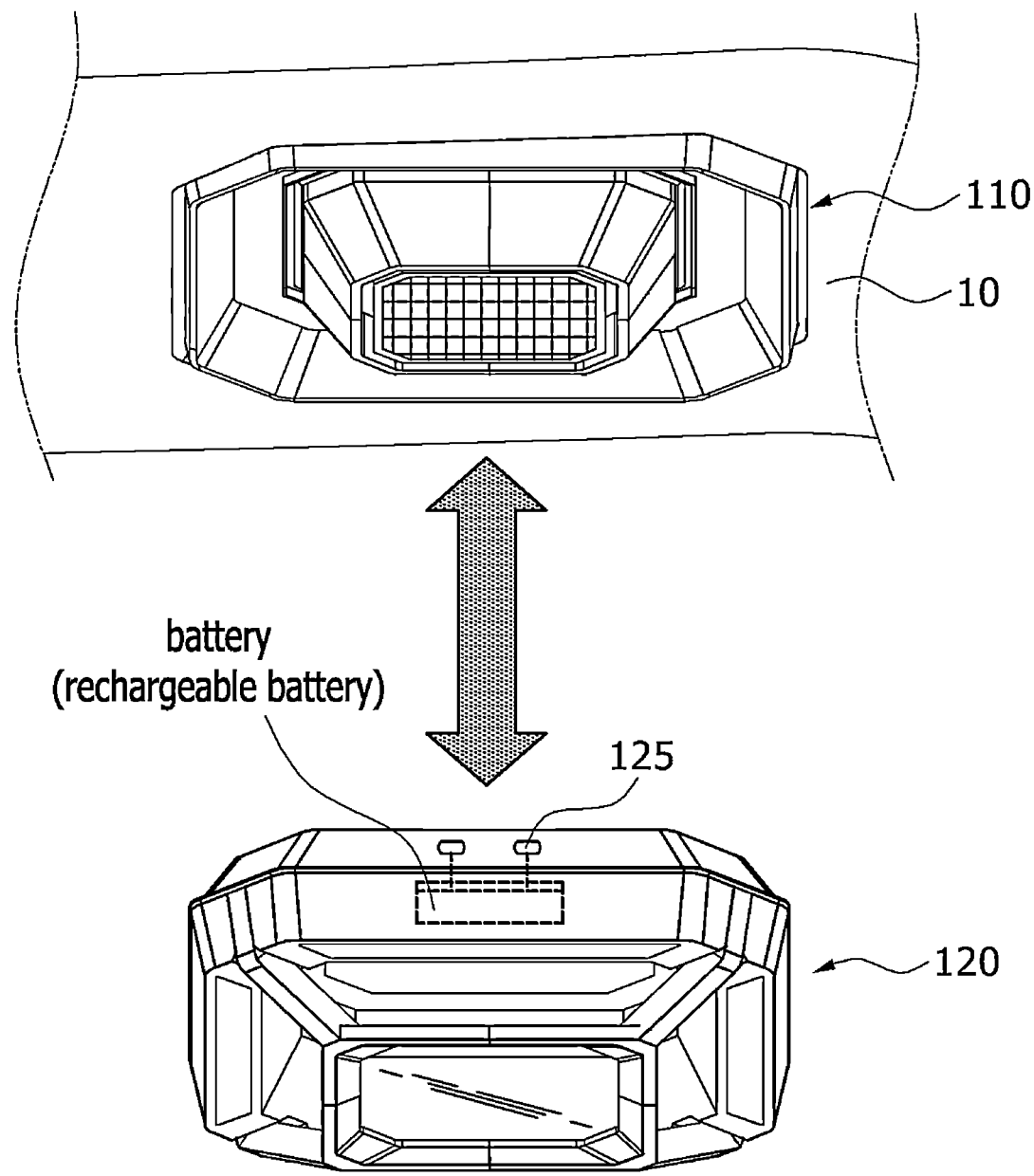

DETACHABLE LIGHT AND VEHICLE INCLUDING THE SAME

CROSS-REFERENCE TO RELATED APPLICATION

This application claims the benefit under 35 U.S.C. § 119(a) of priority to Korean Patent Application No. 10-2022-0173503, filed on Dec. 13, 2022 in the Korean Intellectual Property Office, the entire disclosure of which is incorporated herein by reference for all purposes.

BACKGROUND

Field

Exemplary embodiments of the present disclosure relate to a detachable light and a vehicle including the same, and more particularly, to a detachable light, which may be detached from a vehicle and operate as an independent power source, and a vehicle including the same.

Discussion of the Related Art

Recently, vehicles have begun to serve as a living space beyond a simple means of transportation. For example, there are increasing activities such as traveling by vehicles and then staying overnight in tents stored in the vehicles or staying overnight in the vehicles.

As such, as users stay overnight using the vehicle, there are increasing cases where the user performs work inside and outside the vehicle and light is required to perform the work in many cases. In this case, the user works while emitting light by using a separately prepared light source.

The background technology of the present disclosure is disclosed in Korean Patent No. 10-2085128 (registered on Feb. 28, 2020 and entitled 'SOFT BOX FOR LED LIGHTING HAVING SUPERIOR PORTABILITY').

SUMMARY

In case that a separate light source is prepared, energy needs to be transferred to the light source. The energy is transferred to the light source by being supplied with electric power from a vehicle through an electric wire. Alternatively, an energy source needs to be separately provided as the light source is configured to be rechargeable. In case that the electric power is supplied from the vehicle through the electric wire, there is a need to separately provide the electric wire. In case that the light source is rechargeable, there is an inconvenience of having to charge the light source in advance before using the light source.

The present disclosure has been made in an effort to solve the above-mentioned problem, and an object of the present disclosure is to provide a detachable light, in which a light source of a headlight (headlamp) or tail light (tail lamp), which is used as a light for a vehicle, is configured to be rechargeable, and the light source may be used as a component (headlight or tail light) of the vehicle or as a light source (lantern) for a user's convenience, as necessary.

However, the object to be achieved by the present disclosure is not limited to the above-mentioned object but may be variously expanded without departing from the spirit and scope of the present disclosure.

In one general aspect, a detachable light includes: an outer inclined portion; an inner inclined portion disposed inside the outer inclined portion; a cradle disposed between the outer inclined portion and the inner inclined portion; a frame connected to the outer inclined portion; a battery surrounded by the outer inclined portion and the inner inclined portion; and at least one auxiliary light disposed adjacent to the frame, in which the detachable light is configured to be attached to or detached from a vehicle.

The detachable light may further include a detachable light charging terminal, in which the detachable light charging terminal may be electrically connected to the battery.

The frame includes at least one first frame and a second frame, the at least one first frame may extend from the outer inclined portion, and the second frame may be connected to the at least one first frame.

The detachable light may further include: a light-transmitting cover disposed in a space surrounded by the frame.

The at least one auxiliary light may be disposed on an outer periphery of the detachable light.

The at least one auxiliary light may include a plurality of auxiliary lights, and the auxiliary lights may emit light in different types of patterns.

At least a part of the cradle may be configured to rotate about at least a part of the detachable light so as to be spaced apart from the detachable light.

The cradle may be disposed to be parallel to the detachable light.

The detachable light may further include: a magnet disposed on at least a part thereof.

The detachable light may further include: a locking device disposed on at least a part thereof.

The detachable light may further include: a wireless charging structure disposed on at least a part thereof.

In another general aspect, a vehicle includes: a detachable light including: an outer inclined portion; an inner inclined portion disposed inside the outer inclined portion; a cradle disposed between the outer inclined portion and the inner inclined portion; a frame connected to the outer inclined portion; a battery surrounded by the outer inclined portion and the inner inclined portion; and at least one auxiliary light disposed adjacent to the frame; and a headlight including: a first inclined portion; a second inclined portion disposed outside the first inclined portion; a concave portion disposed between the first inclined portion and the second inclined portion; and a headlight light source disposed to be surrounded by the first inclined portion, in which the detachable light is configured to be attached to or detached from the headlight.

The outer inclined portion of the detachable light may be seated on the second inclined portion of the headlight, the inner inclined portion may be seated on the first inclined portion, and the cradle may be seated on the concave portion, such that the detachable light may be attached to the headlight.

The headlight may include a headlight charging terminal, the detachable light may include a detachable light charging terminal, and the detachable light charging terminal may be configured to be in contact with the headlight charging terminal.

A first magnet may be disposed on at least a part of the headlight, a second magnet may be disposed on at least a part of the detachable light, and an attractive force may be applied between the first magnet and the second magnet.

A first locking device may be disposed on at least a part of the headlight, a second locking device may be disposed on at least a part of the detachable light, and the first locking device and the second locking device may be configured to be coupled to each other.

A first wireless charging structure may be disposed on at least a part of the headlight, a second wireless charging structure may be disposed on at least a part of the detachable light, and the battery may be configured to be charged by the first wireless charging structure and the second wireless charging structure.

According to the present disclosure, the detachable light may be attached to the vehicle and used as the headlight or tail light while the vehicle travels, or the detachable light may be detached from the vehicle and used as the light source, depending on the need of the user. Therefore, the user's convenience may be improved, and the spatial utilization of the vehicle may be improved because a separate space for accommodating a light source or an electric wire is not required.

BRIEF DESCRIPTION OF THE DRAWINGS

FIG. 1B is a perspective view illustrating the detachable light and the vehicle according to the embodiment of the present disclosure.

DETAILED DESCRIPTION

Figure 1A:
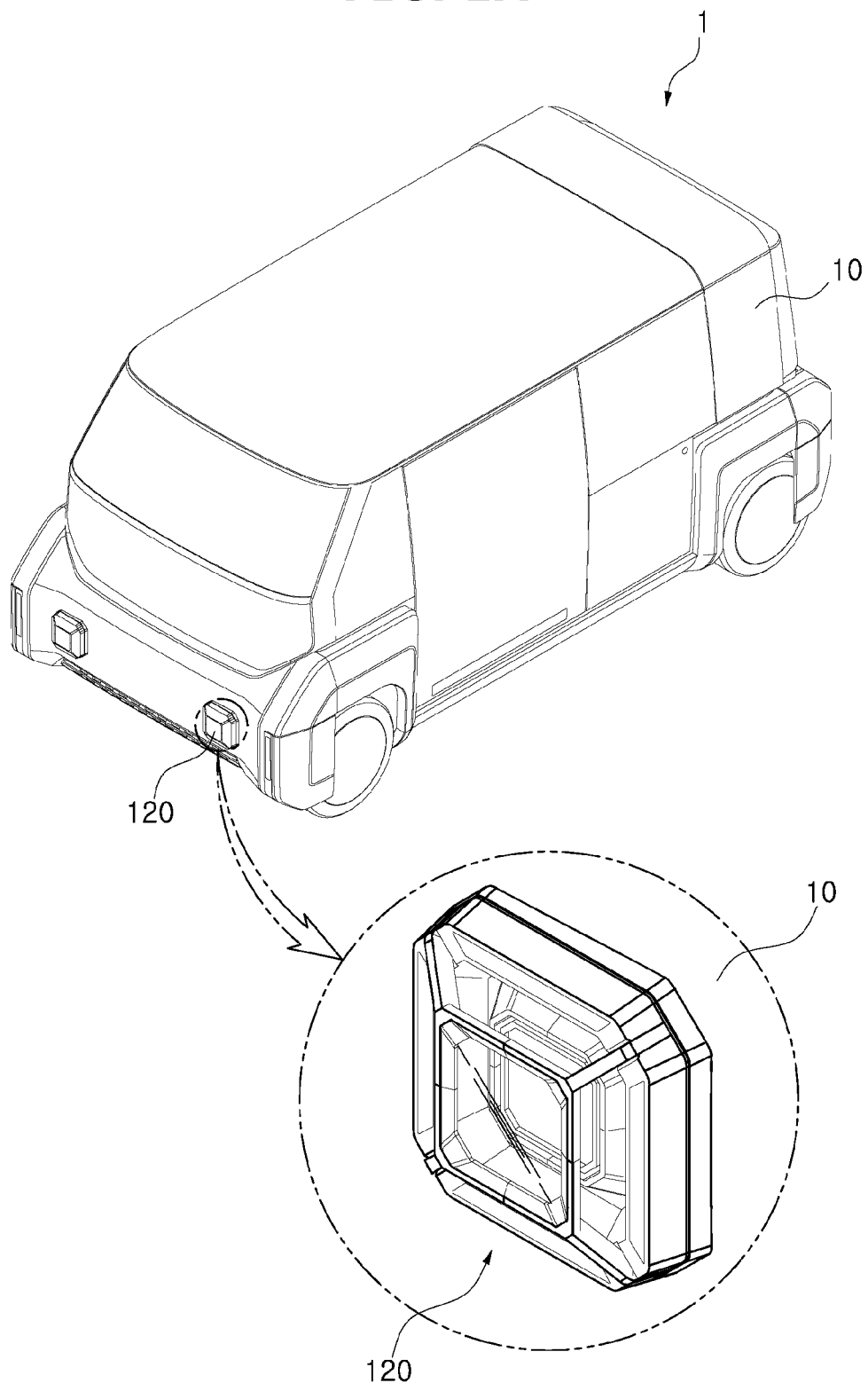
FIG. 1A is a perspective view illustrating a vehicle to which a detachable light according to an embodiment of the present disclosure is attached.

Hereinafter, a detachable light and a vehicle including the same will be described below with reference to the accompanying drawings through various exemplary embodiments of the present disclosure. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

FIG. 1A is a perspective view illustrating a vehicle to which a detachable light according to an embodiment of the present disclosure is attached, and FIG. 1B is a perspective view illustrating the detachable light and the vehicle according to the embodiment of the present disclosure.

With reference to FIGS. 1A and 1B, at least one detachable light 120 may be disposed on at least a part of an outer surface 10 of a vehicle 1 according to an embodiment of the present disclosure.

The detachable light 120 may be disposed on at least a part of the outer surface 10 of the vehicle 1 and configured to emit light to the outside of the vehicle 1. The detachable light 120 may be disposed on a front surface portion of the vehicle 1 or a rear surface portion of the vehicle 1.

According to the embodiment, the detachable light 120 may be configured as a part of a headlamp (headlight) or tail lamp (tail light) of the vehicle 1 or disposed adjacent to the headlamp or tail lamp.

In the embodiment illustrated in FIG. 1A, the detachable light 120 is implemented as a part of the headlamp. However, the embodiment of the present disclosure is not limited thereto. According to another embodiment, the detachable light 120 may be implemented as a turn signal lamp, a daytime running light (DRL), or a position light. The detachable light 120 may be implemented to be disposed on a lateral surface, a rear surface, or an upper surface of the vehicle 1.

With reference to FIG. 1B, it can be ascertained that an embodiment in which the detachable light 120 is disposed on the front surface of the vehicle 1 is implemented.

The detachable light 120 may be attached to the outer surface 10 of the vehicle 1 or detached from the outer surface 10. A headlight 110 may be disposed on the outer surface 10. The headlight 110 may be configured to emit light toward a location in front of the vehicle 1.

A shape of at least a part of the headlight 110 may correspond to a shape of at least a part of the detachable light 120. Therefore, the detachable light 120 may be attached to or detached from the headlight 110.

A magnet (not illustrated) may be disposed on at least a part of the headlight 110, and a magnet (not illustrated) may be disposed on at least a part of the detachable light 120. The magnet of the headlight 110 and the magnet of the detachable light 120 may be disposed at positions corresponding to each other.

Therefore, when the detachable light 120 is attached to the headlight 110, an attractive force is applied between the magnet of the headlight 110 and the magnet of the detachable light 120, such that the detachable light 120 may be attached to the headlight 110.

According to the embodiment, the vehicle 1 may include a locking device (not illustrated) configured to fix the headlight 110 and the detachable light 120. The locking device (not illustrated) may prevent the detachable light 120 from separating from the headlight 110 in an environment that is not intended by the user. The locking device (not illustrated) may be disposed on the headlight 110, the detachable light 120, or both the headlight 110 and the detachable light 120.

The detachable light 120 may include a rechargeable battery (not illustrated). In case that the detachable light 120 is attached to the vehicle 1 or the headlight 110, the rechargeable battery may be charged.

According to the embodiment, the rechargeable battery may be charged in a contact or contactless manner. The vehicle 1 may include a wireless charging structure for charging the rechargeable battery of the detachable light 120 in a wireless manner. According to the embodiment, the wireless charging structure may be disposed in the headlight 110 and/or the detachable light 120.

The configuration in which the rechargeable battery of the detachable light 120 is charged in a contact manner will be described below together with the description with reference to FIGS. 2A and 2B.

Figure 2A:
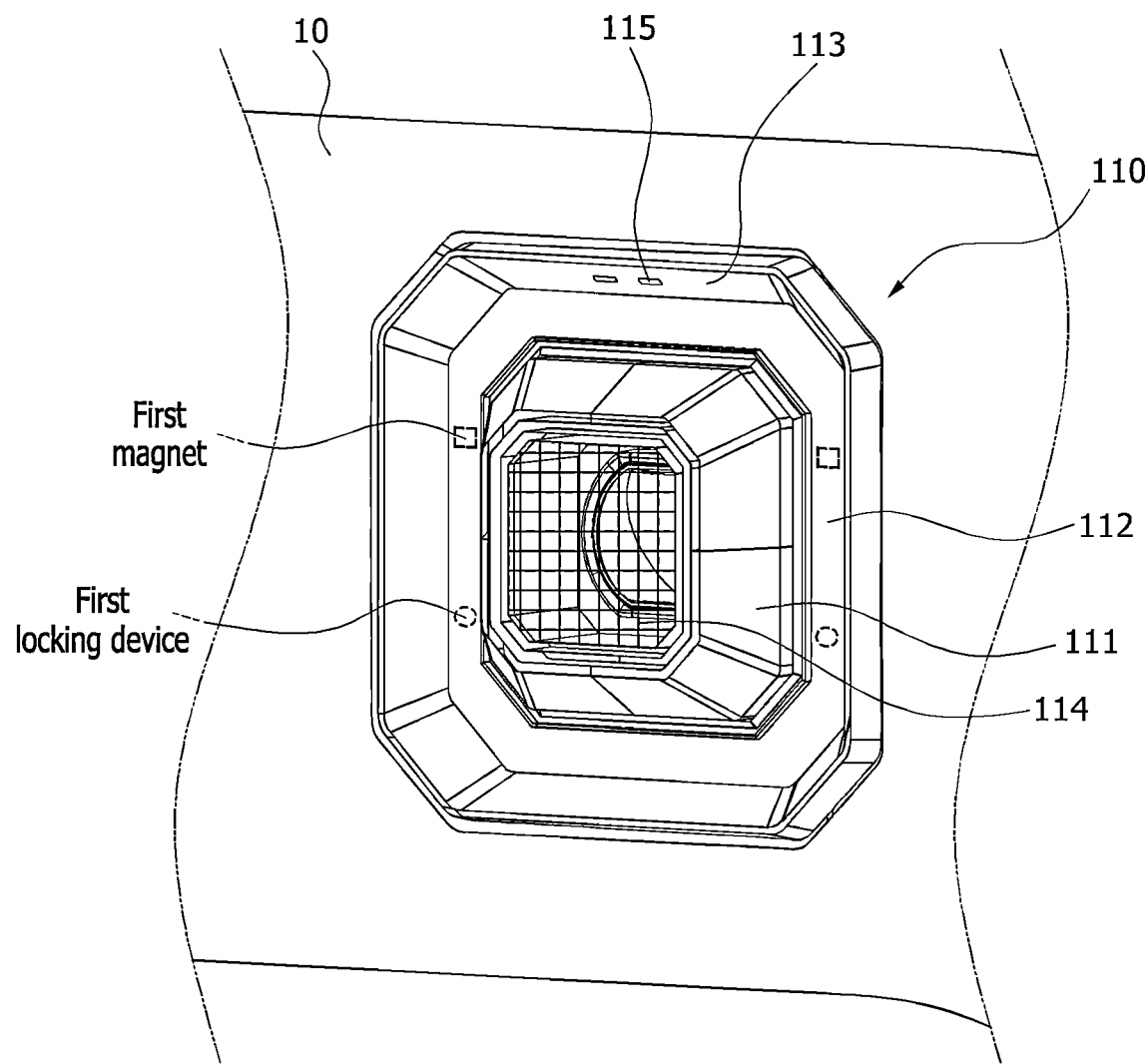
FIG. 2A is a view illustrating a part of the vehicle to which the detachable light according to the embodiment of the present disclosure is attached.
Figure 2B:
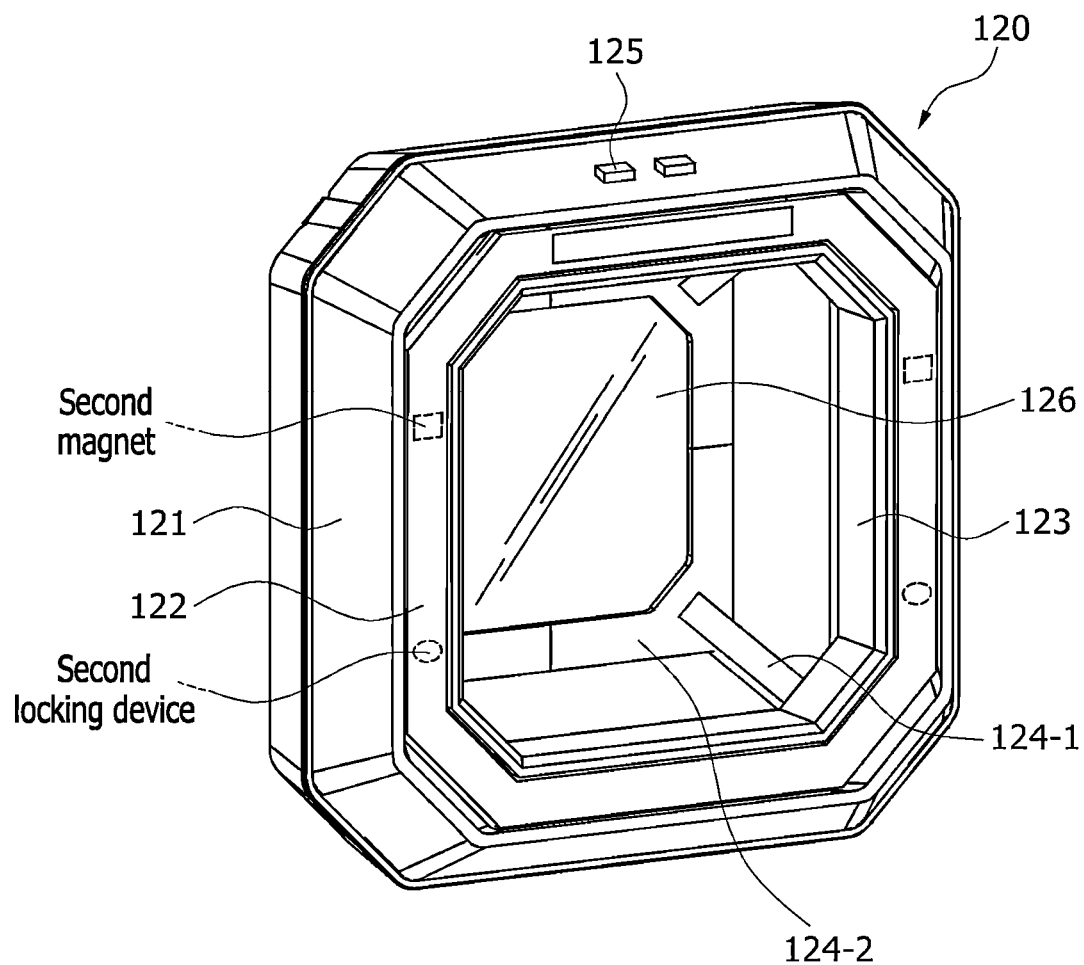
FIG. 2B is a view illustrating the detachable light according to the embodiment of the present disclosure.

FIG. 2A is a view illustrating a part of the vehicle to which the detachable light according to the embodiment of the present disclosure is attached, and FIG. 2B is a view illustrating the detachable light according to the embodiment of the present disclosure.

The headlight 110 and the detachable light 120 illustrated in FIGS. 2A and 2B may be identical or similar to the headlight 110 and the detachable light 120 illustrated in FIGS. 1A and 1B. Therefore, a description of the identical components may be omitted.

The headlight 110 may include a first inclined portion 111, a concave portion 112, a second inclined portion 113, a headlight light source 114, and a headlight charging terminal 115.

With reference to FIG. 2A, the headlight 110 according to the embodiment may include the first and second inclined portions 111 and 113 inclined inward from the outer surface 10 of the vehicle 1. The concave portion 112 may be disposed between the first inclined portion 111 and the second inclined portion 113.

At least a part of the detachable light 120 may be accommodated in the first inclined portion 111, the second inclined portion 113, and the concave portion 112. A shape of the first inclined portion 111 may be implemented as an approximately quadrangular shape, and a shape of the second inclined portion 113 may be implemented as an approximately quadrangular shape. The shapes of the first and second inclined portions 111 and 113 are not limited to the quadrangular shape, but may be implemented as other shapes.

The headlight light source 114 may be disposed to be surrounded by the first inclined portion 111. The headlight light source 114 may emit light toward a location in front of the vehicle 1. The headlight light source 114 may be configured as various light sources such as LEDs and halogen bulbs.

The headlight 110 may include the headlight charging terminal 115. The headlight charging terminal 115 may be disposed on the second inclined portion 113 and electrically connected to the rechargeable battery of the detachable light 120. According to the embodiment, the headlight charging terminal 115 may be disposed on the first inclined portion 111 and electrically connected to the rechargeable battery of the detachable light 120. Therefore, the rechargeable battery may be charged through the headlight charging terminal 115.

With reference to FIG. 2B, the detachable light 120 may include an outer inclined portion 121, a cradle 122, an inner inclined portion 123, a frame 124, a detachable light charging terminal 125, and a light-transmitting cover 126.

The outer inclined portion 121, the cradle 122, and the inner inclined portion 123 may be disposed on a rear surface portion of the detachable light 120. In case that the detachable light 120 is attached to the headlight 110, the outer inclined portion 121 of the detachable light 120 may be seated on the second inclined portion 113 of the headlight 110, the inner inclined portion 123 of the detachable light 120 may be seated on the first inclined portion 111 of the headlight 110, and the cradle 122 of the detachable light 120 may be seated on the concave portion 112 of the headlight 110.

Therefore, when the detachable light 120 is attached to the headlight 110, the movement of the detachable light 120 may be guided by the outer and inner inclined portions 121 and 123 of the detachable light 120 and the first and second inclined portions 111 and 113 of the headlight 110.

The frame 124 may be disposed on a front surface portion (a surface opposite to the surface on which the outer inclined portion 121, the cradle 122, and the inner inclined portion 123 are disposed) of the detachable light 120. The frame 124 may be disposed on the front surface of the detachable light 120 and reduce impact transmitted to the detachable light 120 from the outside. The frame 124 may include a first frame 124-1 and a second frame 124-2.

At least one first frame 124-1 may extend from the detachable light 120 and be disposed to be inclined toward the front surface of the detachable light 120. According to the embodiment, four first frames 124-1 may be disposed to be inclined from vertices of the detachable light 120 toward the front surface of the detachable light 120. The second frame 124-2 may be configured to connect the plurality of first frames 124-1. A shape of the second frame 124-2 may be configured as an approximately quadrangular shape. At least a part of the frame 124 may be gripped by the user. According to the embodiment, at least one of the first frame 124-1 and the second frame 124-2 may be gripped by the user.

The detachable light charging terminal 125 may be disposed on at least a part of the outer inclined portion 121. According to the embodiment, the detachable light charging terminal 125 may be disposed on at least a part of the inner inclined portion 123. When the detachable light charging terminal 125 is in contact with the headlight charging terminal 115, the rechargeable battery (not illustrated) embedded in the detachable light 120 may be charged. According to another embodiment, the rechargeable battery (not illustrated) may be charged in a wireless manner.

The light-transmitting cover 126 may be disposed in a space surrounded by the second frame 124-2. The light-transmitting cover 126 may prevent foreign substances existing outside the vehicle 1 from being introduced into the headlight 110. The light emitted from the headlight light source 114 of the headlight 110 may be emitted to the location in front of the vehicle 1 while passing through the light-transmitting cover 126.

Figure 3A:
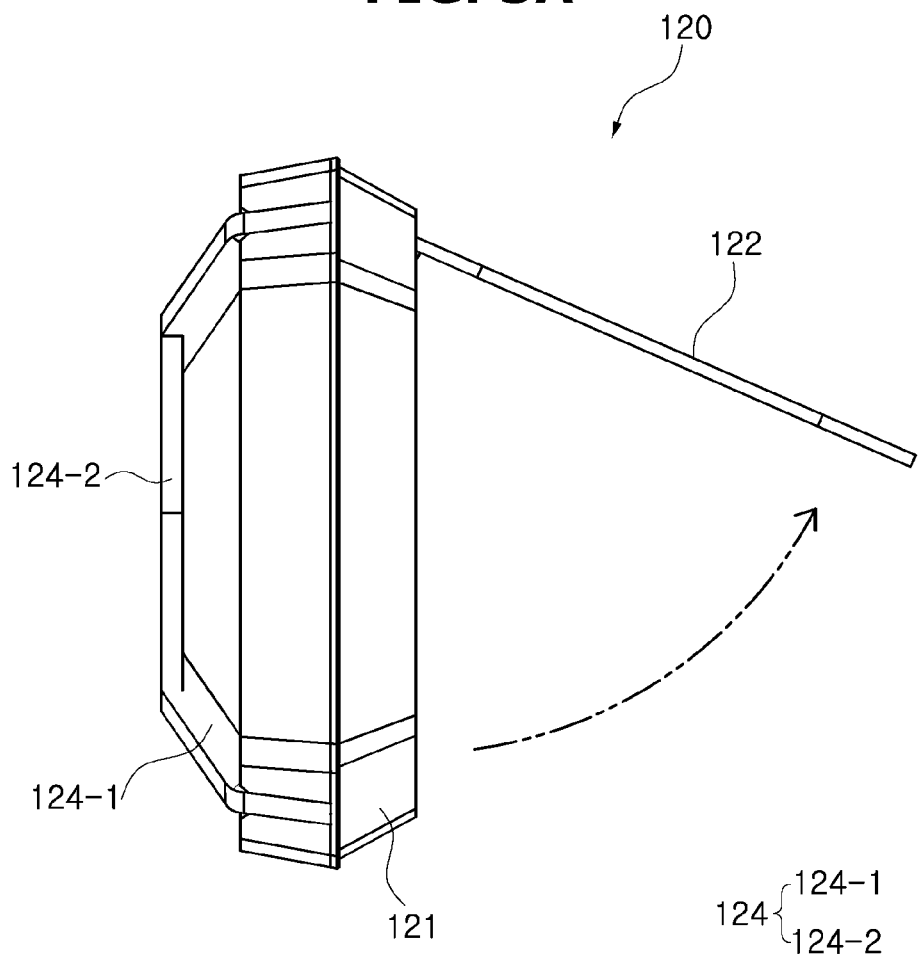
FIG. 3A is a side view illustrating the detachable light according to the embodiment of the present disclosure.
Figure 3B:
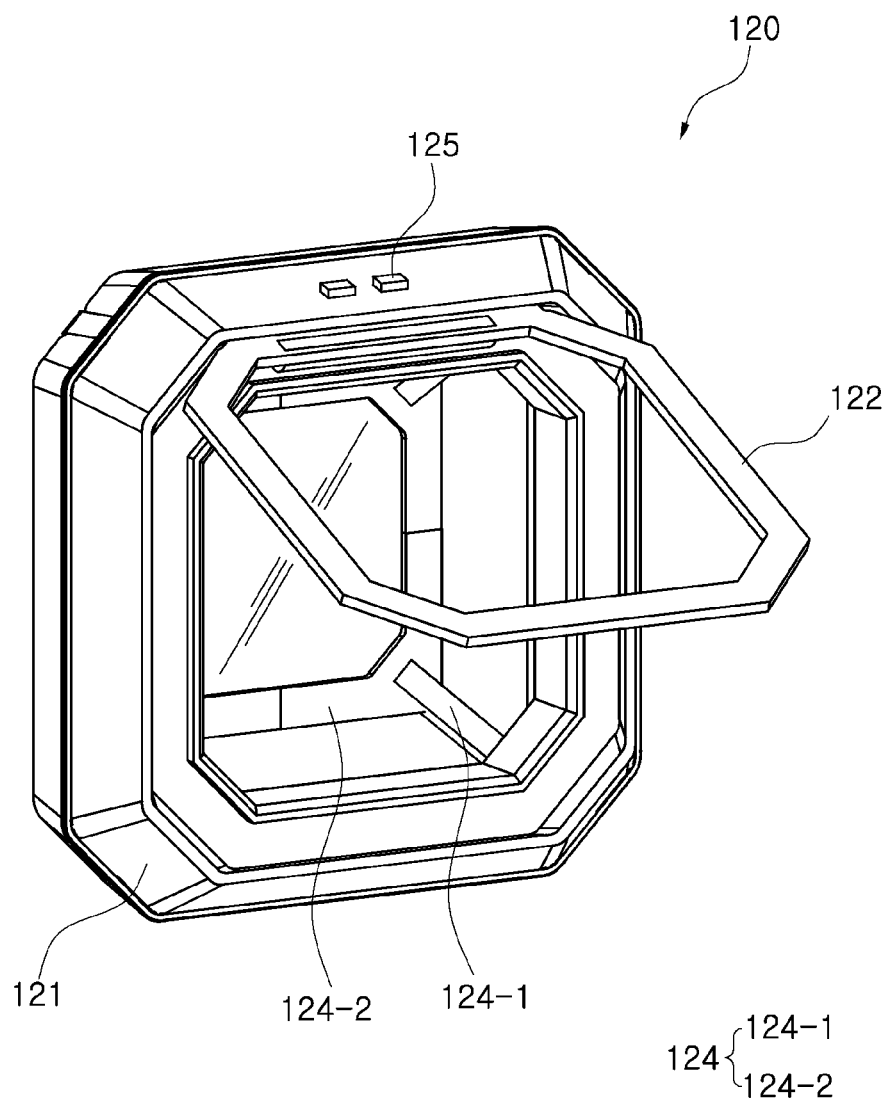
FIG. 3B is a perspective view illustrating the detachable light according to the embodiment of the present disclosure when viewed from a rear side of the detachable light.
Figure 3C:
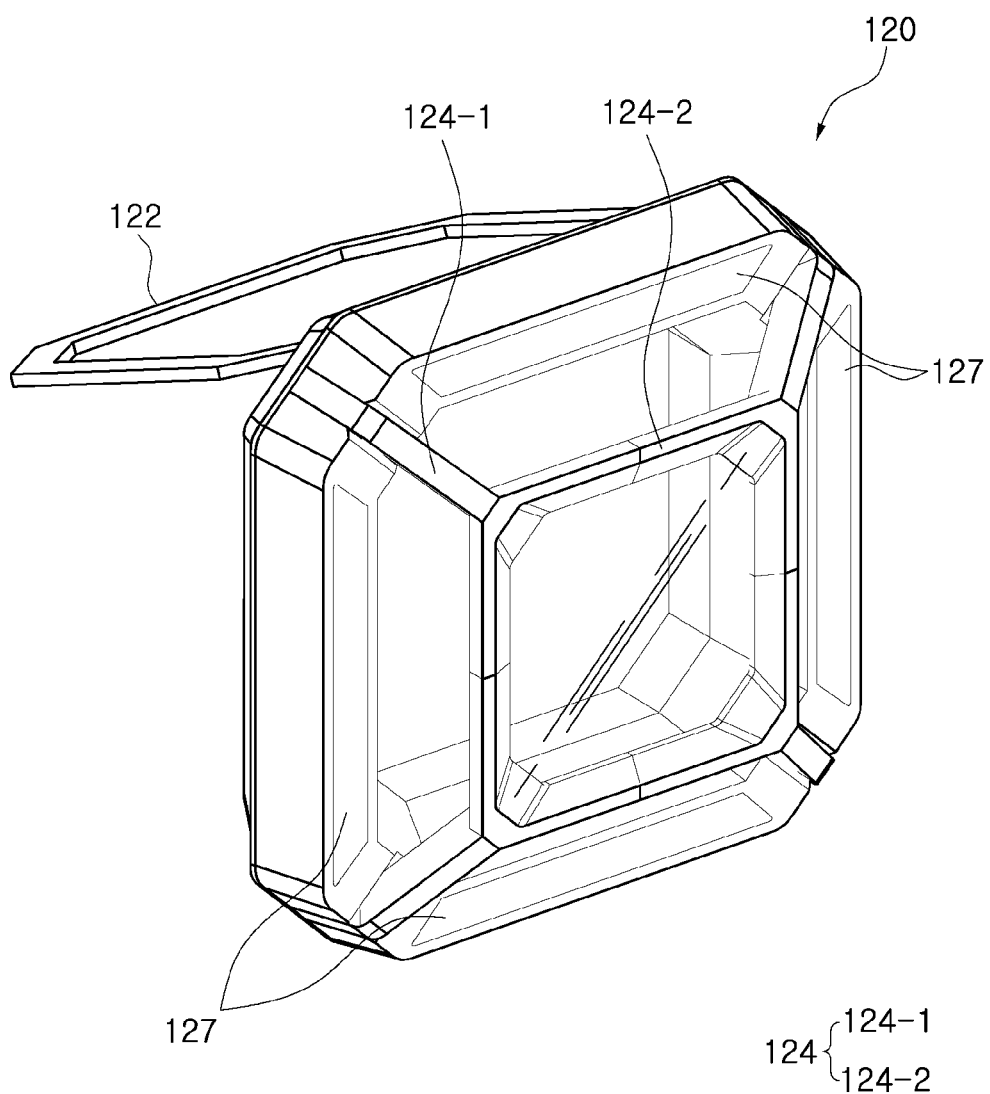
FIG. 3C is a perspective view illustrating the detachable light according to the embodiment of the present disclosure when viewed from a front side of the detachable light.

FIG. 3A is a side view illustrating the detachable light according to the embodiment of the present disclosure, FIG. 3B is a perspective view illustrating the detachable light according to the embodiment of the present disclosure when viewed from a rear side of the detachable light, and FIG. 3C is a perspective view illustrating the detachable light according to the embodiment of the present disclosure when viewed from a front side of the detachable light.

The detachable light 120, the outer inclined portion 121, the cradle 122, the frame 124, the first frame 124-1, the second frame 124-2, and the detachable light charging terminal 125, which are illustrated in FIGS. 3A to 3C, may be identical or similar to the detachable light 120, the outer inclined portion 121, the cradle 122, the frame 124, the first frame 124-1, the second frame 124-2, and the detachable light charging terminal 125 illustrated in FIGS. 1 to 2B. Therefore, a description of the identical components may be omitted.

With reference to FIGS. 3A to 3C, at least a part of the cradle 122 may be configured to be spaced apart from the detachable light 120. According to the embodiment, an upper portion of the cradle 122 may rotate about at least a part of the detachable light 120. A lower portion of the cradle 122 may be spaced apart from the detachable light 120. Because at least a part of the cradle 122 is spaced apart from the detachable light 120, the detachable light 120 may be mounted on a ground surface or other surface. A distance by which at least a part of the cradle 122 is spaced apart from the detachable light 120 may be adjusted by the user. Therefore, a mounting angle of the detachable light 120 may be adjusted.

At least one auxiliary light 127 may be disposed on at least a part of the detachable light 120. According to the embodiment, the auxiliary light 127 may be disposed on the front surface portion of the detachable light 120. According to the embodiment, the auxiliary light 127 may be disposed on an outer periphery of the detachable light 120. According to the embodiment, the auxiliary light 127 may be disposed on a side formed on the detachable light 120. According to the embodiment, four auxiliary lights 127 may be disposed on four sides of the quadrangular detachable light 120. The auxiliary light 127 may emit light by being supplied with electric power from the rechargeable battery (not illustrated) embedded in the detachable light 120. The plurality of auxiliary lights 127 may emit light in different types of patterns.

According to the embodiment, in case that the detachable light 120 is attached to the vehicle 1, the auxiliary light 127 may operate as a daytime running light (DRL), a position light, or a turn signal lamp. In case that the detachable light 120 is detached from the vehicle 1, the auxiliary light 127 may operate as a light source having multiple levels of brightness such as first brightness (bright) and second brightness (dark), or the auxiliary light 127 may operate as a warning light. Alternatively, in case that the detachable light 120 is detached from the vehicle 1, the auxiliary light 127 may operate as a daytime running light (DRL), a position light, or a turn signal lamp.

In case that the detachable light 120 is attached to the vehicle 1, the auxiliary light 127 may operate as a light source having multiple levels of brightness such as first brightness (bright) and second brightness (dark), or the auxiliary light 127 may operate as a warning light. The operating states of the auxiliary light 127 may be differently set, as necessary. According to the embodiment, the plurality of auxiliary lights 127 may be configured to operate in different ways. According to the embodiment, at least one auxiliary light 127 may operate to produce white light, and another auxiliary light 127 may operate as a warning light.

Figure 4:
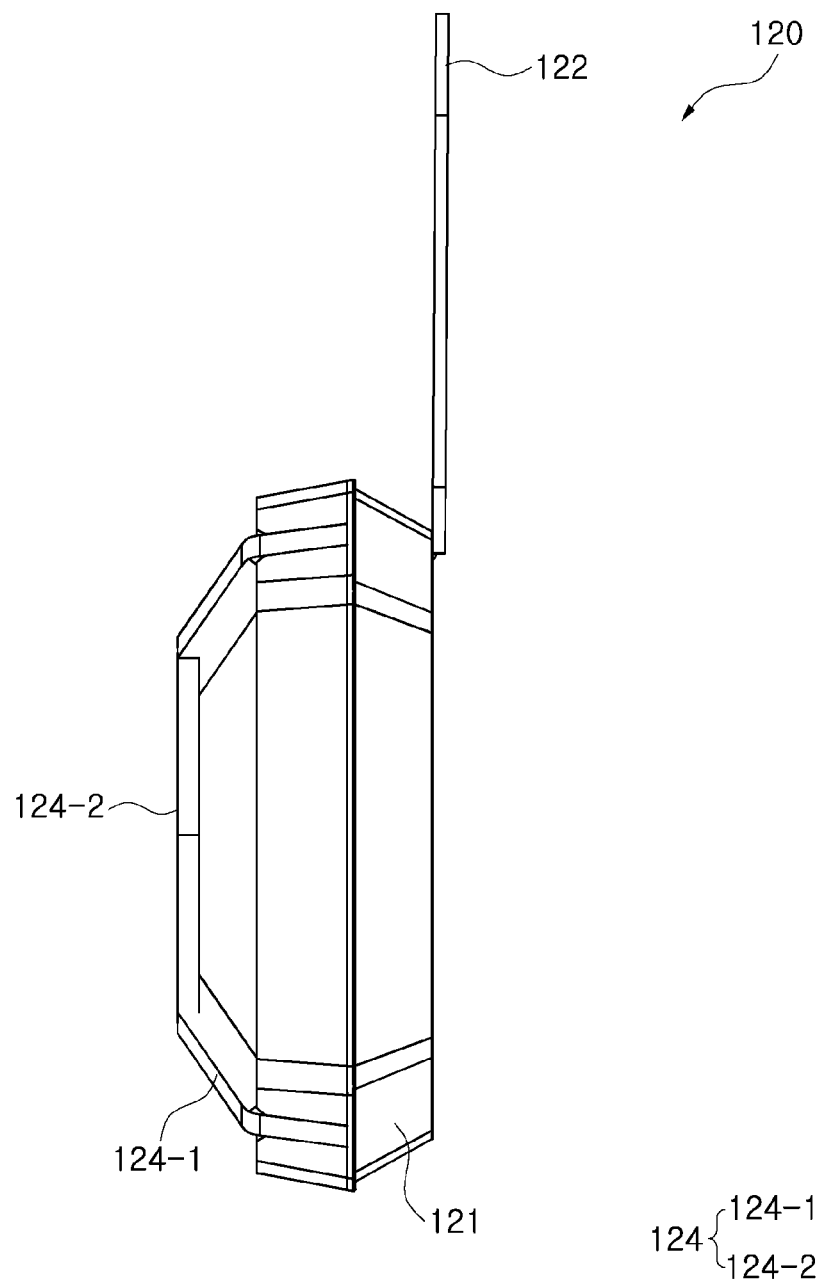
FIG. 4 is a side view illustrating the detachable light according to the embodiment of the present disclosure.

FIG. 4 is a side view of the detachable light according to various embodiments of the present disclosure.

The detachable light 120, the outer inclined portion 121, the cradle 122, the frame 124, the first frame 124-1, and the second frame 124-2, which are illustrated in FIG. 4, may be identical or similar to the detachable light 120, the outer inclined portion 121, the cradle 122, the frame 124, the first frame 124-1, and the second frame 124-2 illustrated in FIGS. 1 to 3C. Therefore, a description of the identical components may be omitted.

With reference to FIG. 4, at least a part of the cradle 122 may be spaced apart from the detachable light 120, and the cradle 122 and the detachable light 120 may be configured to be parallel to each other. Because the cradle 122 is configured to be parallel to the detachable light 120, the cradle 122 may serve as a handle.

Therefore, the user may easily grip the detachable light 120 and easily move the detachable light 120. In addition, the user may be safe from heat generated by the auxiliary light 127 of the detachable light 120.

While the specific embodiments have been described above in the detailed description of the present document, it is apparent to those skilled in the art that various modifications may be made without departing from the scope of the present document.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A detachable light comprising:
an outer inclined portion;
an inner inclined portion disposed inside the outer inclined portion;
a cradle disposed between the outer inclined portion and the inner inclined portion;
a frame connected to the outer inclined portion;
a battery surrounded by the outer inclined portion and the inner inclined portion; and
at least one auxiliary light disposed adjacent to the frame,
wherein the detachable light is configured to be attached to or detached from a vehicle.

2. The detachable light of claim 1, further comprising:
a detachable light charging terminal electrically connected to the battery.

3. The detachable light of claim 1, wherein the frame comprises at least one first frame and a second frame, the at least one first frame extends from the outer inclined portion, and the second frame is connected to the at least one first frame.

4. The detachable light of claim 1, further comprising:
a light-transmitting cover disposed in a space surrounded by the frame.

5. The detachable light of claim 1, wherein the at least one auxiliary light is disposed on an outer periphery of the detachable light.

6. The detachable light of claim 5, wherein the at least one auxiliary light includes a plurality of auxiliary lights, and each of the auxiliary lights emit light in different types of patterns.

7. The detachable light of claim 1, wherein at least a part of the cradle is configured to rotate about at least a part of the detachable light so as to be spaced apart from the detachable light.

8. The detachable light of claim 7, wherein the cradle is disposed parallel to the detachable light.

9. The detachable light of claim 1, further comprising:
a magnet disposed on at least a part thereof.

10. The detachable light of claim 1, further comprising:
a locking device disposed on at least a part thereof.

11. The detachable light of claim 1, further comprising:
a wireless charging structure disposed on at least a part thereof.

12. A vehicle comprising:
a detachable light comprising:
  an outer inclined portion;
  an inner inclined portion disposed inside the outer inclined portion;
  a cradle disposed between the outer inclined portion and the inner inclined portion;
  a frame connected to the outer inclined portion;
  a battery surrounded by the outer inclined portion and the inner inclined portion; and
  at least one auxiliary light disposed adjacent to the frame; and
a headlight comprising:
  a first inclined portion;
  a second inclined portion disposed outside the first inclined portion;
  a concave portion disposed between the first inclined portion and the second inclined portion; and
  a headlight light source surrounded by the first inclined portion,
wherein the detachable light is configured to be attached to or detached from the headlight.

13. The vehicle of claim 12, wherein the outer inclined portion of the detachable light is seated on the second inclined portion of the headlight, the inner inclined portion of the detachable light is seated on the first inclined portion of the headlight, and the cradle of the detachable light is seated on the concave portion of the headlight, such that the detachable light is attached to the headlight.

14. The vehicle of claim 13, wherein the headlight comprises a headlight charging terminal, the detachable light comprises a detachable light charging terminal, and the detachable light charging terminal is configured to be in contact with the headlight charging terminal.

15. The vehicle of claim 12, wherein a first magnet is disposed on at least a part of the headlight, a second magnet is disposed on at least a part of the detachable light, and an attractive force is applied between the first magnet and the second magnet.

16. The vehicle of claim 12, wherein a first locking device is disposed on at least a part of the headlight, a second locking device is disposed on at least a part of the detachable light, and the first locking device and the second locking device are configured to be coupled to each other.

17. The vehicle of claim 12, wherein a first wireless charging structure is disposed on at least a part of the headlight, a second wireless charging structure is disposed on at least a part of the detachable light, and the battery is configured to be charged by the first wireless charging structure and the second wireless charging structure.

\* \* \* \* \*